United States Patent [19]

Peterson et al.

[11] Patent Number: 4,711,768

[45] Date of Patent: Dec. 8, 1987

[54] PROCESS FOR THE SEPARATION OF GADOLINIUM ISOTOPES

[75] Inventors: Steven H. Peterson, Murrysville; Edward J. Lahoda, Edgewood; Sharon L. Weisberg, Pittsburgh, all of Pa.

[73] Assignee: Westinghouse Electric Corp., Pittsburgh, Pa.

[21] Appl. No.: 746,143

[22] Filed: Jun. 18, 1985

Related U.S. Application Data

[63] Continuation-in-part of Ser. No. 638,331, Aug. 6, 1984, abandoned.

[51] Int. Cl.$^4$ ............................................. B01D 59/30
[52] U.S. Cl. ........................................ 423/21.5; 423/2
[58] Field of Search .............................. 423/21.5, 2, 7; 210/688

[56] References Cited

U.S. PATENT DOCUMENTS

| | | | |
|---|---|---|---|
| 3,615,173 | 10/1971 | Sparks et al. | 423/21.5 |
| 3,953,568 | 4/1976 | Seko et al. | 423/7 |
| 4,394,353 | 7/1983 | Miyake et al. | 423/21.5 |
| 4,514,367 | 4/1985 | Asami et al. | 423/21.5 |

OTHER PUBLICATIONS

F. Molnar et al, *J. of Chromatography*, 26(1967), pp. 215-231.

*Primary Examiner*—John F. Terapane
*Assistant Examiner*—Virginia B. Caress
*Attorney, Agent, or Firm*—R. D. Fuerle

[57] ABSTRACT

An efficient and economical separation of the gadolinium isotopes $Gd^{155}$, $Gd^{156}$ and/or $Gd^{157}$ from mixtures containing the same is effected by a liquid chromatographic column system using an ion exchange resin and an eluant solution. A portion of the eluant solution is used to saturate the columns and a feed solution containing the mixture of gadolinium isotopes is charged to the columns. Further eluant solution is passed through the saturated columns containing the feed solution to form a fraction of eluant solution rich in the desired gadolinium isotopes which is separated from the remainder of the eluant upon discharge from the columns.

17 Claims, 2 Drawing Figures

PROCESS FOR THE SEPARATION OF GADOLINIUM ISOTOPES

This is a continuation-in-part of U.S. patent application Ser. No. 638,331, filed Aug. 6, 1984 now abandoned.

FIELD OF THE INVENTION

The present invention is a process for the separation of rare earth isotopes from mixtures containing the same. The process may be used to separate specifically desired gadolinium isotopes from a mixture with other gadolinium isotopes or from a mixture of other gadolinium isotopes and other rare earth elements.

BACKGROUND OF THE INVENTION

Nuclear reactor operation can be described in terms of "neutron economy." In simple terms, fission of a fuel nucleus releases one or more neutrons, and one neutron is required to sustain the chain reaction. Many of the design features of a nuclear reactor are based upon their impact on the neutron economy. In particular, materials for use in reactors are selected for their neutron capture cross-sections, $\sigma$, along with other properties. Low $\sigma$ materials are selected for most reactor components, such as support structure, fuel rod cladding, moderators, and the like. High $\sigma$ materials are selected for particular uses such as control rods and burnable poison shims. A burnable poison shim is a high $\sigma$ material added in carefully selected quantities to decrease neutron flux early in a fuel cycle, and to become transparent or neutral after neutron absorption so that late in a fuel cycle more of the fission neutrons are absorbed by fuel.

The element with the highest $\sigma$ for the natural isotope mixture is gadolinium. However, its use is limited because as the gadolinium concentration increases, the fuel thermal conductivity and melting temperature decrease. Additionally, production of high weight percent (about 8 weight percent) gadolinium fuel is judged to be more difficult than low weight percent (less than about 4 weight percent). Only two isotopes have high absorbance, as illustrated in the following table:

| Properties of Naturally Occurring Gadolinium Isotopes | | |
|---|---|---|
| Isotope Mass | Natural Abundance | $\sigma$ (Thermal) Barns |
| 152 | 0.20% | 125 |
| 154 | 2.15 | 102 |
| 155 | 14.73 | 61,000 |
| 156 | 20.47 | 1,000 |
| 157 | 15.68 | 254,000 |
| 158 | 24.87 | 3.5 |
| 160 | 21.90 | 0.77 |

As illustrated, $Gd^{155}$ and $Gd^{157}$ have the highest $\sigma$ of the gadolinium isotopes but make up only about 30 percent of the natural gadolinium. The cost-to-benefit ratio of the use of gadolinium as a burnable poison shim can be decreased by using an isotope enrichment process to increase the abundance of the high $\sigma$ isotopes, while at the same time decreasing the negative affects.

Various processes have been proposed for the separation or enrichment of isotopes, such as those using photochemical reactions, laser techniques and ion exchange separation. A number of isotope separation processes have been based on chemical exchange, as described in *Isotope Separation*, S. Villani, American Nuclear Society, 1976. One method is ion exchange chromatography, in which a solution containing the element of interest, in ionic form, is passed through a column of ion exchange resins. Exchange of ions is between resin-bound and solution phase forms. As a general rule, ions containing a heavy isotope are concentrated in the heavier component, which is the resin in the case of ion exchange.

Commercial purification of rare earth elements was originally based on ion exchange separations. Of particular interest is a pair of publications by F. Molnar, A. Horvath and V. A. Khalin in the Journal of Chromatography, Vol. 26 (1976), the first entitled "Anion Exchange Behavior of Light Rare Earths in Aqueous Methanol Solutions Containing Neutral Nitrates, I. Separation of Carrier-Free Light Rare Earths" (pp. 215–224); and "Anion Exchange Behavior of Light Rare Earths in Aqueous Methanol Solutions Containing Neutral Nitrates, II. Macro-Micro Separations" (pp. 225–231). These publications report on separation of rare earth elements, and particularly on separation of gadolinium from its neighboring elements on the periodic table, europium and terbium. The chromatographic peaks shown therein have abnormal shapes, and suggest, to the present inventors, that the peak shape is being influenced by a small degree of isotope separation, although the authors did not make such an interpretation.

An object of the present invention is to provide a process that will separate desired isotopes of gadolinium from a mixture containing other gadolinium isotopes.

It is another object of the present invention to provide a process for the separation of desired isotopes of gadolinium from a mixture containing other gadolinium isotopes and other rare earth elements.

It is a further object of the present invention to provide an efficient and economical process for separating gadolinium isotopes using an ion exchange resin, with recovery of eluant solution and various by-products.

SUMMARY OF THE INVENTION

Separation of a preferred gadolinium isotope, or isotopes, from a mixture with other gadolinium isotopes is effected by a liquid chromatographic column system using an anion or cation exchange resin.

For an anion exchange resin, an eluant solution is provided that contains ammonium nitrate, in a concentration of between 1–2 N, in aqueous methanol, the aqueous methanol containing 70–85 percent by volume methanol. A plurality of columns, preferably 5–30 columns, and more preferably 20–30 columns, containing a basic anion exchange resin is saturated with the eluant solution, and a feed solution comprising eluant solution and the mixture of gadolinium isotopes is charged to the first of the plurality of saturated columns. Additional eluant solution is passed through the saturated columns containing the feed solution, and a fraction of eluant solution rich in the desired gadolinium isotopes formed, which fraction is separated from the remainder of the eluant solution after passage through the columns. Aqueous methanol and ammonium nitrate are recovered from the eluant and the aqueous methanol recycled to form further eluant solution.

For the cation ion exchange resin, an eluant solution containing EDTA is provided. A plurality of columns containing a strong acid ion exchange resin is saturated with the eluant solution, and a feed solution comprising eluant solution and the mixture of gadolinium isotopes is charged to the first of the plurality of saturated columns. Additional eluant solution is passed through the saturated columns containing the feed solution, and a fraction of the eluant solution rich in the desired gadolinium isotopes formed, which fraction is separated from the remainder of the solution after passage through the columns. Aqueous EDTA is recovered from the eluant and the aqueous EDTA recycled to form further eluant solution.

DETAILED DESCRIPTION

Figure 1:
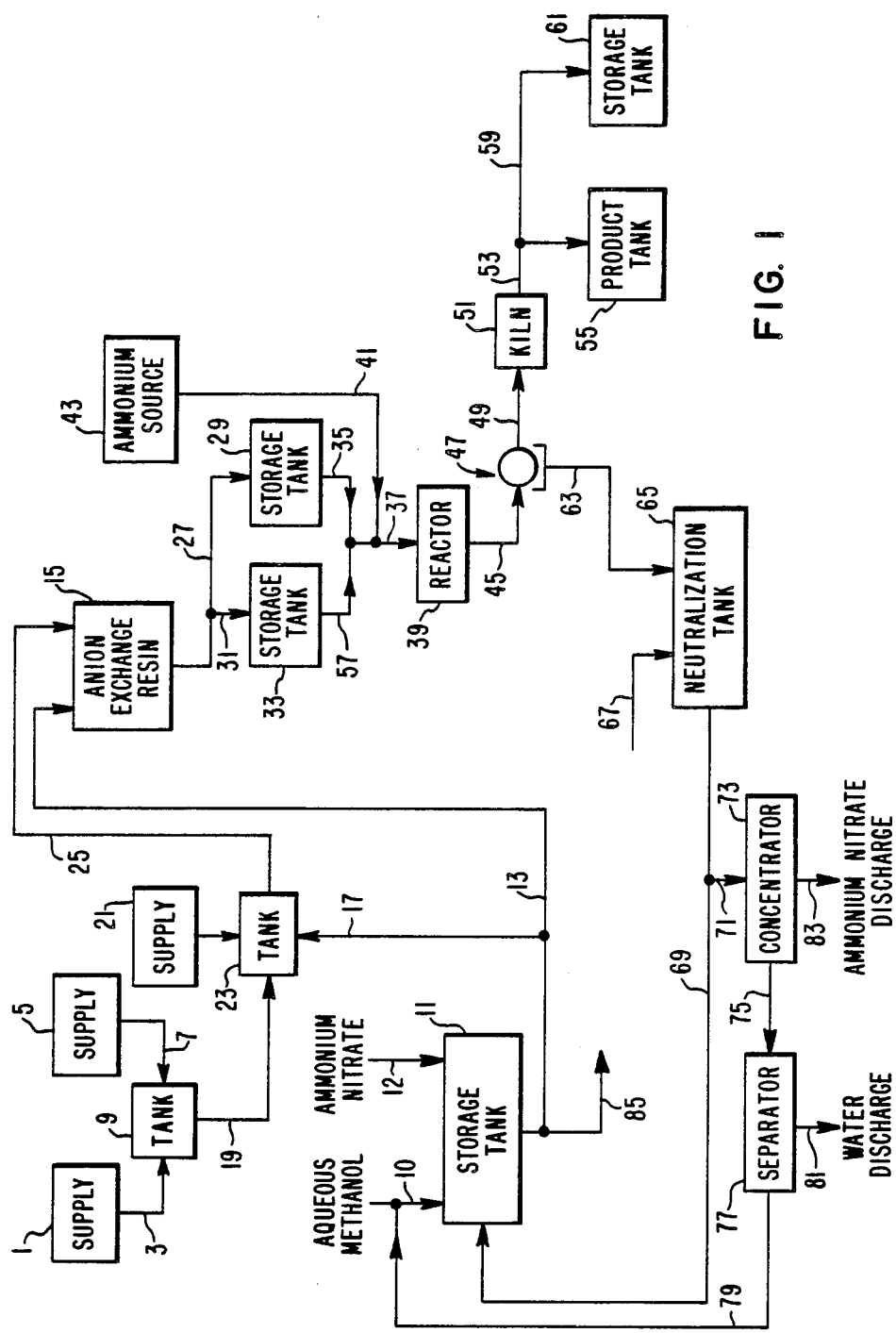
FIG. 1 is a flow chart schematically illustrating an embodiment of a process of the present invention for separation of gadolinium isotopes.

The present process effects the efficient and economical separation of desired gadolinium isotopes from mixtures containing the same. Of particular interest is the separation of a mixture of $Gd^{155}$, $Gd^{156}$ and $Gd^{157}$, or any one or more of those isotopes.

The mixture that is treated according to the present invention can comprise a mixture of gadolinium isotopes that has previously been separated from other rare earth metals, or a mixture containing gadolinium isotopes and other rare earth metals such as samarium (Sm), europium (Eu), terbium (Tb), and dysprosium (Dy). The starting material used in the process can comprise the oxides or metals of these elements that are converted to nitrate in solution, such as by dissolving the same in nitric acid, or a nitrate solution of the elements or other strong mineral acid, such as hydrochloric or sulfuric acid.

The separation is preferably effected using an eluant solution and a saturated anionic or cationic exchange resin.

For the embodiment using an anion resin, an eluant solution is prepared which consists essentially of aqueous methanol and which contains ammonium nitrate. The solution contains aqueous methanol, with a methanol content of between 70–85 percent by volume. If less than about 70 volume percent methanol is used, the separation of the isotopes is reduced and an efficient and economical separation is not achieved, while if greater than about 85 volume percent methanol is used, the gadolinium compounds will tend to precipitate from the solution and separation is prevented. Preferably, the aqueous methanol will contain about 80 percent methanol.

The aqueous methanol contains ammonium nitrate in an amount sufficient to provide a 1.0–2.0 normal solution (1.0–2.0 N), i.e. between one and two gram moles of ammonium nitrate per liter of solution. The normality, as described, should be between about 1.0–2.0. If a normality of less than about 1.0 is used, the elution time required is extended and the amount of eluant needed increased to a value that is not efficient. If a normality of more than about 2.0 is used, the elution rate is so strong as to prevent adequate separation of the isotopes. This normality is important relative to the eluant solution, as well as to the feed solution hereinafter described. In the preferred mode, the ammonium nitrate is present in the solution in a concentration of about 1.5 N.

This eluant solution is used initially to saturate a plurality of columns of an anion exchange resin.

A plurality of columns of an anion exchange resin are required in order to effect an efficient and economical separation of the gadolinium isotopes. The number and length of these columns may vary dependent upon the system desired. For example, a system comprised of about 80–120 columns of resin, each having a length of about three meters, could be used, although use of a fewer number of columns is preferred. A system which contains between 20–30 columns of anion exchange resin is preferred, where each column of resin has a length of about thirteen meters.

The diameter of the columns is a matter of choice and is selected based on the production rate desired.

The anion exchange resin used is a strongly basic anion exchange resin having quaternary amine groups, generally prepared by the chloromethylation of styrene–divinylbenzene copolymers followed by aminating of the same. An example of a suitable such quaternary ammonium basic anion exchange resin is Amberlite IRA-400 made by Rohm & Haas Co. The anion exchange resin should be of a particle size of between 37 microns to 74 microns (200–400 mesh, U.S. standard sieve) in diameter.

In the present process, the columns of anion exchange resin are saturated with the eluant solution. A feed solution of the gadolinium isotope mixture, prepared by dissolving the gadolinium isotope compounds in further eluant solution, is then charged to first saturated column, the feed solution containing a nitrate solution of the gadolinium isotopes and ammonium nitrate, the nitrate concentration being of a concentration of between 1–2 N, preferably 1.5 N. As above-described, the nitrates are preferably formed by dissolving the gadolinium mixture in nitric acid, and the feed solution adjusted to the desired concentration of nitrates by addition of ammonium nitrate. Other strong mineral acids such as hydrochloric and sulfuric acid may be substituted for nitric acid.

The amount of feed solution that is charged to the saturated columns of anionic resin will vary dependent upon the diameter of the column. The amount should be that sufficient to provide a band of isotopes that is narrow relative to the length of the column. Preferably, the feed solution should be in an amount that will produce a band that is of a length equal to about 0.1 percent of the length of the column. After the feed solution has been deposited on the saturated anion exchange resin, additional eluant solution is passed through the columns and forms a fraction of eluant solution rich in the desired gadolinium isotopes and a remainder of eluant solution containing the other gadolinium isotopes, and other rare earth elements, when present.

The additional eluant solution is charged to the columns at a flow rate of 1 ml/in$^2$ of resin column/minute. The flow rate again may vary dependent upon other conditions followed, but the flow rate should be between about 0.5–2.0 ml/in$^2$ of resin column/minute, with a flow rate of about 1 ml/in$^2$ of resin column/minute being preferred. The eluant solution should be maintained at a temperature of between about 40°–70° C., preferably at 50° C., upon charging to the columns and during passage therethrough. With flow of the additional eluant solution through the columns, the isotopes are sequentially stripped from the anion exchange resin and form the fraction of desired isotopes as a downwardly moving band of eluant solution containing the same. The desired fraction, when it reaches the bottom of the column, may be readily collected and separated from the remainder of the eluant solution.

In another embodiment of the present invention, more than one band or ring of isotope mixture, or feed solution, may be present in the column at a particular time. In this embodiment, after the columns have been saturated with eluant solution, a first charge of feed solution is fed to the columns and additional eluant solution passed through the columns causing the band or ring of isotopes to progress downwardly. After this initial band has moved a sufficient distance from the top of the columns, but while not completely discharged therefrom, a further charge of feed solution may be made to the columns to form a further band or ring. Flow of additional eluant solution therethrough will move both bands, while effecting formation of the desired fractions of isotopes, which fractions are then separated after passage through the columns.

The fraction of eluant solution containing the desired isotopes, or product, and the remainder of the eluant solution, or tails, may be collected in separate storage tanks and separately treated. The product and tails may both be processed in a similar manner. The metal nitrates are precipitated by adding ammonium thereto to form a hydroxide precipitate, and the precipitate removed, such as by filtering on a rotary drum filter. The hydroxide precipitate is then removed from the filter and calcined in a kiln to produce the product in oxide form. The eluant, separated as the filtrate in the rotary filter, is treated and aqueous methanol recycled to the system. The filtrate is adjusted in pH to a value of about 7.0, and the aqueous methanol recycled for formation of further eluant solution. A portion of the eluant, about 5 percent, is removed as a bleed stream to keep residual inpurities from building up in the system. The bleed stream is concentrated to about 99+ percent, such as in a vacuum column, with the aqueous methanol recycled, while the residue is concentrated to give ammonium nitrate which may be used as a by-product from the separation process.

The drawing schematically illustrates one process in accordance with the present invention. As illustrated, a supply 1 of gadolinium isotope mixture which may comprise a mixture of gadolinium isotopes or a mixture of gadolinium isotopes and other rare earth metals is passed through line 3, and a supply 5 of nitric acid is passed through line 7 and the two are combined and metal nitrates formed in tank 9. A supply of eluant solution 11 is provided, which is comprised of aqueous methanol (80 percent by volume) from line 10, which eluant solution contains ammonium nitrate from line 12 in a concentration to give a 1.5 N eluant solution. Eluant solution is passed through line 13 to a plurality of columns of basic anion exchange resin 15, and the resin saturated with the eluant solution.

With the columns of basic anion exchange resin 15 saturated, a feed solution is formed by mixing further eluant solution from line 17 with gadolinium nitrates from line 19, and ammonium nitrate from a supply 21. The feed solution formed in tank 23 is charged through line 25 to the plurality of basic anion resin columns 15.

After the feed solution has been charged to the plurality of columns, additional eluant solution from line 13 is passed through the plurality of columns containing the feed solution and a fraction of eluant solution is formed that is rich in the desired isotopes of gadolinium. This fraction is separated and discharged through line 27 to a product storage tank 29. The remainder of the eluant solution which contains other gadolinium isotopes and other rare earth elements, where present, is discharged through line 27 to a branch line 31 and then to a separate tails storage tank 33.

The product gadolinium isotopes and other components of the mixture may be processed in batch operations at different times. The desired gadolinium isotopes, in nitrate form, are discharged through line 35 to a feed line 37 of a reactor 39. Ammonium is also charged to the reactor 39 through line 41, from a source 43 thereof. In the reactor 39, precipitation of the gadolinium isotopes as a hydroxide is effected. The precipitate and eluant are discharged from reactor 39 through line 45 to a filter 47, such as a rotary drum filter. The precipitate is passed through line 49 to a kiln 51 and the precipitate treated to form gadolinium oxide. The gadolinium oxide formed in kiln 51 is discharged through line 53 to a product supply tank 55. In processing of the other isotopes and rare earths, the same sequence may be used, with the tails from tank 33 passed through line 57 to feed line 37, the reactor 39 for formation of precipitate, and the eluant and precipitate passed through line 45 to filter 47. The precipitate is then passed through line 49 to kiln 51, and the oxides so formed discharged through line 53 to branch line 59 and storage tank 61.

In order to recycle the aqueous methanol, the filtrate from filter 47 is fed through line 63 to a storage and neutralization tank 65. Nitric acid is charged to the tank 65 through line 67 to neutralize the ammonium hydroxide present. Aqueous methanol is removed from tank 65 and returned by means of recycle line 69 to form further eluant solution 11. A portion of the solution from line 69 is discharged through line 71 and is concentrated in a concentrator 73, such as a vacuum column. The aqueous methanol from concentrator 73 is passed through line 75 to a separator 77 to recover methanol that is returned through line 79 to form further eluant solution 11. Water separated in separator 77 is discharged through line 81. The concentrated ammonium nitrate formed in concentration 73 is discharged through line 83.

A bleed stream is removed from the system, about 5 percent of the eluant solution formed during continuous operation of the system with recycling effected, through a line 85 so as to prevent buildup of impurities in the continuously operating system.

In the embodiment of the present invention using cation resins, the eluant used is selected from ethylenediaminetetra acetic acid (EDTA), acetonylacetone (AcAc) or benzoylacetone (BzAc), with EDTA being preferred. To improve production, it is contemplated that the resin may be preloaded with copper sulfate. In our preferred embodiment, the eluant contains 0.5 to 1.0 w/o EDTA at a pH of between 7 and 9. A more preferred concentration is about 1.0 w/o at a pH of 8.2 to 8.7.

The cation resin has a size in the range of 50–100 mesh, U.S. standard sieve. Preferably the cation resin is a strong acid styrene gel type and is used in a train of 50 to 60 thirteen meter long columns. IRC-120 is an example of such a resin and is manufactured by Rohm & Haas Co.

The flow rate through the columns is about 0.5 to 2 ml/minute/cm$^2$, with about 1 ml/minute/cm$^2$ preferred, while the loading of gadolinium is between 0.5 and 2 gm/cm$^2$, with 1 gm/cm$^2$ preferred. The gadolinium feed is dissolved in any strong mineral acid, with nitric acid preferred.

Figure 2:
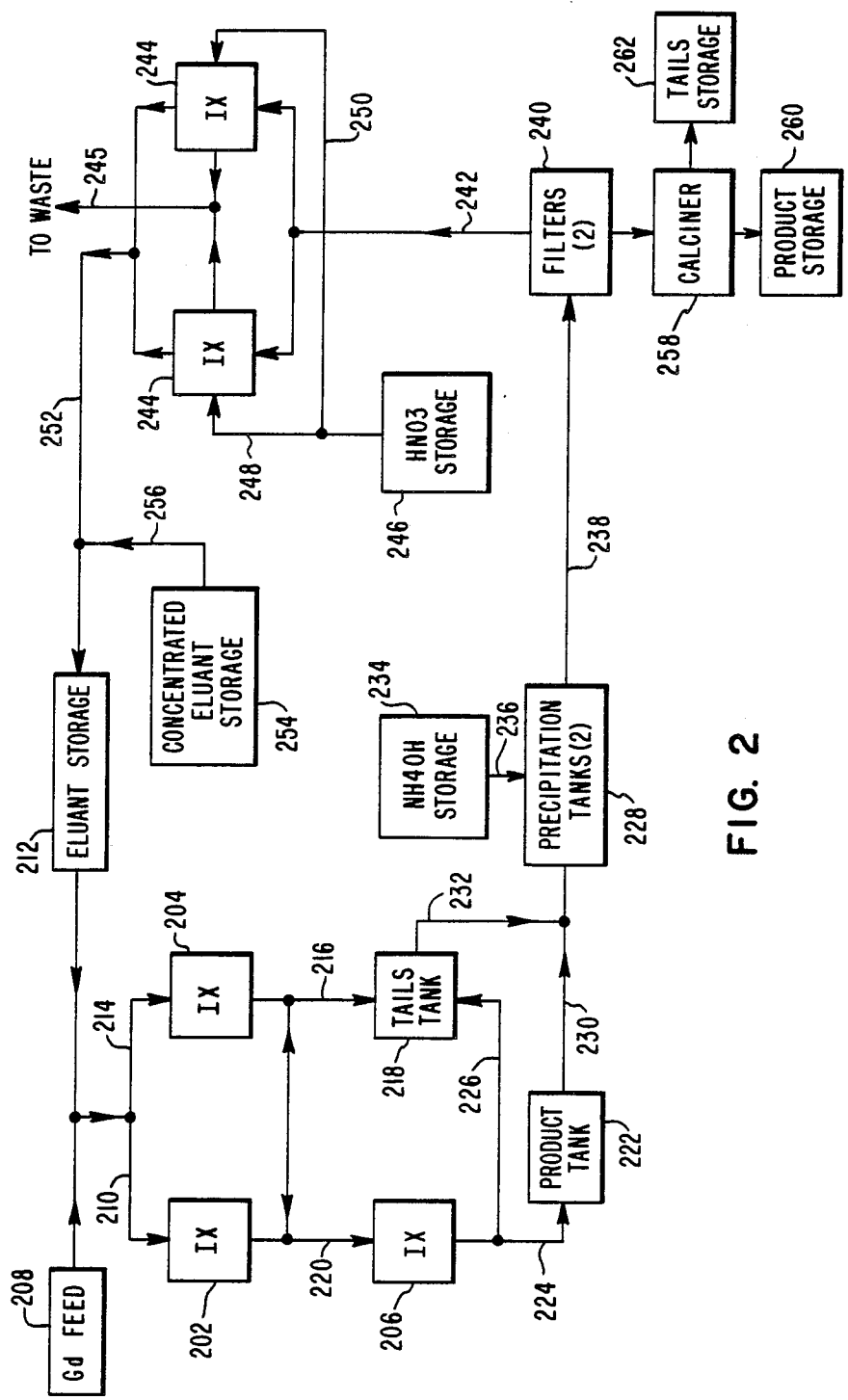
FIG. 2 is a flow chart schematically illustrating a second embodiment of the process in accordance with the present invention.

FIG. 2 presents an overall flow sheet for an embodiment of gadolinium isotope separation utilizing cation ion exchange. The process utilizes two 550 foot long trains of strong acid ion exchange resin (e.g. IRC-120) to separate the isotopes of gadolinium. The first 550 foot long train utilizes parallel sets of columns 202 and 204, 40 feet in height. The second train utilizes a single set of columns 206, 40 feet in height. The operation is as follows.

Concentrated gadolinium nitrate feed from storage tank 208 is injected via line 210 into column set 202. Eluant from storage tank 212 is then pumped via line 210 into column set 202 at a predetermined rate. After about 1000 minutes, gadolinium nitrate from storage tank 208 is injected into column set 204 via line 214 followed by eluant from storage tank 212.

As wave fronts emerge from column set 202, the fractions that contain gadolinium isotopes 152, 154, 158 and 160 are discarded via line 216 into tails tank 218. The fractions that contain gadolinium isotopes 155, 156 and 157 are sent to the second train of ion exchange columns 206 via line 220. This same procedure is repeated as wave fronts emerge from column set 204. This method of operation reduces the number of ion exchange columns required by 25%.

As the wave fronts emerge from the second train of ion exchange columns 206, the fractions which contain gadolinium isotopes 155 and 157 are sent to product tank 222 via line 224, while the fraction containing gadolinium isotope 156 is sent to tails tank 218 via line 226.

The contents of the product 222 and tails 218 tank are batched through precipitation tanks 228 via lines 230 and 232, respectively. The precipitation tanks 228 include at least two tanks so that one tank always handles the tails while the other tank is devoted solely to processing the product. In the precipitation tanks 228 ammonium hydroxide from storage tank 234 is added via line 236 to precipitate the gadolinium as the hydroxide. The mixture formed is then sent via line 238 to filter presses 240 (one press for Gd 155 and 157 and one press for Gd 152, 154, 156, 158 and 160) where the gadolinium hydroxide precipitates are removed. The filtrate containing ammonium hydroxide and EDTA is discharged via line 242 to weak acid ion exchange resin columns 244 where it is treated to remove ammonium ions. Nitric acid is added from storage tank 246 via lines 248 and 250 to regenerate the weak acid ion exchange resin. Ammonium nitrate is discharged via line 245 as waste. The resulting recycled filtrate (an aqueous solution of EDTA) is then sent via line 252 to the eluant storage tank. The concentration of the EDTA in the recycled eluant is checked and EDTA is added as needed from EDTA concentrate storage tank 254 via line 256.

The filter cakes of gadolinium hydroxide produced by filters 240 are then sent to electric calciner 258 where they are calcined to gadolinia and then sent to product 260 or tails 262 storage as appropriate.

The preceding examples have described the present invention utilizing processes producing a product enriched in Gd 155, 156 and 157, or enriched in Gd 155 and 157. It should be understood that product enriched in only $Gd^{155}$ or $Gd^{157}$ are also contemplated. Preferably the product produced by this invention contains at least about 80% by weight, and more preferably at least about 90% by weight, of the desired gadolinium isotope or isotopes.

It is further contemplated that a weak acid resin (such as IRC-84 manufactured by Rohm & Haas) may be substituted for the strong acid resins described above. It is also contemplated that a high pressure liquid chromatographic system may also be used to practice the present invention. In this case a silica based resin such as Partisil 10 SCX may be used.

While the present invention has been demonstrated using gadolinium, it is believed that the isotope separation process described can be applied by those of ordinary skill in the art, with modifications as needed, to the isotope separation of any rare earth metal having two or more isotopes.

The preceding examples have clearly demonstrated the process according to the present invention. Other embodiments of the invention will become more apparent to those skilled in the art from a consideration of the specification or practice of the invention disclosed herein. It is intended that the specification and examples be considered as exemplary only, with the true scope and spirit of the invention being indicated by the following claims.

What is claimed is:

1. The process for separation of the gadolinium isotopes from a mixture of gadolinium isotopes comprising:
   providing an eluant solution consisting essentially of aqueous methanol, containing 70-85 percent by volume methanol, and having a concentration of ammonium nitrate of a value of 1.0-2.0 N;
   saturating a plurality of columns of a strongly basic anion exchange resin with said eluant solution;
   forming a gadolinium feed solution of said mixture of isotopes;
   charging said feed solution to said plurality of saturated columns;
   passing additional said eluant solution through said plurality of columns containing the feed solution so as to form a first fraction of eluant solution richer in at least one of said gadolinium isotopes than a second fraction containing at least one other of said isotopes;
   separating said first fraction from said second fraction after passage through said columns;
   recovering the aqueous methanol and ammonium nitrate from the eluant after passage through said columns; and
   recycling aqueous methanol so recovered for formation of further said eluant solution.

2. The process for separation of gadolinium isotopes as defined in claim 1 wherein said mixture comprises $Gd^{155}$, $Gd^{156}$, $Gd^{157}$ and other gadolinium isotopes.

3. The process for separation of gadolinium isotopes as defined in claim 2 wherein said mixture comprises said gadolinium isotopes and other rare earth elements.

4. The process for separation of gadolinium isotopes as defined in claim 1 wherein said eluant solution contains aqueous methanol containing about 80 volume percent methanol.

5. The process for separation of gadolinium isotopes as defined in claim 1 wherein said plurality of columns comprises 5-30 columns, and each column has a length of about thirteen meters.

6. The process for separation of gadolinium isotopes as defined in claim 1 wherein at least one of said gadolinium isotopes $Gd^{155}$, $Gd^{156}$ and $Gd^{157}$ is separated from the others of said fraction after passage through said columns.

7. The process for separation of gadolinium isotopes as defined in claim 1 wherein said feed solution is in an amount sufficient to form a band in said column of a length of about 0.1 percent to the length of the column and the flow rate of said additional eluant solution is between 0.5–2.0 ml/in$^2$ of resin column/minute.

8. The process for separation of gadolinium isotopes as defined in claim 1 wherein, prior to complete passage of said fraction through said columns, a further charging of feed solution to said columns is effected, and further eluant solution passed through said columns to form a second said fraction therein.

9. The process for separation of gadolinium isotopes as defined in claim 1 wherein said eluant solution and said feed solution have a concentration of nitrates of a value of about 1.5 N.

10. The process for separation of gadolinium isotopes as defined in claim 1 wherein said additional eluant solution is passed through said plurality of columns at a temperature of between about 40°–70° C.

11. A process for separation of a gadolinium isotope from a mixture of gadolinium isotopes, said process comprising the steps of:

saturating a plurality of columns of a strong acidic cationic exchange resin with an aqueous eluant solution selected from the group consisting of ethylenediaminetetracetic acid, acetonylacetone, and benzoylacetone;

passing a solution containing said mixture of gadolinium isotopes and said eluant solution through said plurality of columns;

passing additional said eluant solution through said plurality of columns;

as said solution containing said gadolinium isotopes exits the last of said plurality of columns, separating a band of solution enriched in at least one of said gadolinium isotope from bands enriched in other of said gadolinium isotopes.

12. The process according to claim 11 further comprising the step of forming gadolinium from said band of solution enriched in said gadolinium isotope.

13. The process according to claim 11 wherein said eluant is ethylenediaminetetraacetic acid.

14. The process for separation of gadolinium isotopes as defined in claim 1 wherein the temperature of said eluant solution is about 40° to 70° C.

15. The process for separation of gadolinium isotopes as defined in claim 1 wherein said strongly basic anion exchange resin has quaternary amine group.

16. The process according to claim 11 wherein said strongly acidic cationic exchange resin is a styrene gel type.

17. The process according to claim 11 wherein said eluant has a concentration of 0.5 to 1.0% by weight at a pH between 7 and 9.

* * * * *